Patented Dec. 20, 1938

2,140,715

UNITED STATES PATENT OFFICE 2,140,715

METHOD FOR THE PRODUCTION OF CHLORINE CONTAINING DERIVATIVES OF RUBBER

John M. Peterson, Kennett Square, Pa., assignor to Hercules Powder Company, Wilmington, Del., a corporation of Delaware No Drawing. Application September 12, 1936, Serial No. 100,471

6 Claims. (Cl. 260—1)

This invention relates to an improved method for the production of chlorine containing derivatives of rubber.

Heretofore rubber has been chlorinated by the treatment of rubber dissolved in a suitable solvent, with chlorine. Natural rubber produces solutions of very high viscosity at low concentrations, so that it is desirable to subject the rubber, either before or after solution, to some pretreatment process to reduce its viscosity and allow the chlorination of solutions of higher concentration than could otherwise be treated.

Heretofore it has been known that when a solution of rubber is treated with chlorine in the production of chlorinated rubber, that the viscosity of the rubber solution increases during the preliminary stages of the chlorination, and thereby increases the difficulty of securing uniform and rapid chlorination.

Now I have found the very surprising fact that the treatment of a solution of rubber with chlorine in small amounts, produces a marked reduction in the viscosity, instead of increasing it, as when greater amounts of chlorine are used in the production of chlorinated rubber. The presence of water is not essential to produce a reduction in the viscosity of the rubber solution, so it is evident that the reduction in viscosity is not due to an oxidation process, since as is well known, chlorine does not function as an oxidizing agent in the absence of water.

The process in accordance with this invention utilizes this action of small amounts of chlorine in reducing the viscosity of rubber solutions, in the production of chlorine containing derivatives of rubber, and will be found to be particularly advantageous in that it is inexpensive and does not introduce foreign contaminating materials into the reaction mixture.

The process in accordance with this invention comprises dissolving rubber in a suitable volatile solvent therefor, pretreating it with small amounts of chlorine, and then treating the solution with chlorine in amounts to react with the dissolved rubber to produce a chlorine containing derivative of rubber.

The solvent utilized in the process in accordance with my invention may be any volatile solvent for rubber suitable for use in the chlorination of rubber, such as for example, carbon tetrachloride, ethylene dichloride, chloroform, etc. The rubber used may be natural crepe rubber or it may be rubber which has been subjected to a disaggregating treatment, such as milling, oxidation, etc., although usually I prefer to use natural crepe rubber. The concentration of rubber used in the solution will depend on the type of rubber employed, and will be sufficiently low to permit complete and uniform solution of the rubber. In general, I may use a concentration of crepe rubber within the range of about 1% to about 7% by weight of the solution, although I ordinarily prefer to use a concentration within the range of about 3% to about 5% by weight of the solution. If well milled rubber is used, considerably higher concentrations may be employed.

The maximum below which the amount of chlorine added to the rubber solution must be kept to secure a decrease in solution viscosity, depends upon the concentration of the rubber solution treated, the solvent present, the temperature, etc., and hence, the maximum amount of chlorine used in the pretreatment step of my process can only be defined as the amount above which no reduction in the viscosity of the rubber solution occurs under the conditions of treatment. Ordinarily, I prefer to use an amount of chlorine within the range of about 0.02% to about 0.5% by weight of the solution treated, although concentrations from about 0.001% to about 1% are suitable under certain conditions.

The scope of my invention is not limited to the addition of chlorine in any particular form to the rubber solution in the pretreatment step of my process. The chlorine may be added in the form of a dry or a moist gas or may be added as a solution in a suitable organic solvent.

The pretreatment step of my process may be carried out at any desired temperature up to the boiling point of the solvent, and will preferably be carried out at a temperature near the boiling point of the solvent to obtain the most rapid reduction in the viscosity of the rubber solution. This step of my process may be advantageously carried out in the presence of light, although the presence of light is not essential. It may, if desired, be carried out in the presence of other viscosity reducing reagents.

My preferred method of procedure is to dissolve or to substantially dissolve the rubber in the solvent prior to the addition of chlorine and then to rapidly add a predetermined amount of chlorine while agitating the solution, and then to allow the solution to stand until the desired drop in viscosity has occurred. After the addition of chlorine the viscosity of the solution will decrease rapidly at first and then more slowly until it stops entirely. It is not necessary to allow the solution to stand until it reaches its minimum viscosity before proceeding to produce the desired chlorine containing derivative of rubber, and in certain instances is undesirable from the standpoint of the time consumed.

Alternately, I may add the chlorine to the volatile rubber solvent, dissolve the rubber therein, and then allow the solution to stand. In following this procedure it is desirable to use adequate precaution to avoid the formation of a non-homogeneous solution.

Again, I may dissolve or substantially dissolve the rubber in the volatile solvent and then continually add a predetermined quantity of chlorine during the period allowed for the viscosity reduction.

Following the pretreatment step for reducing the viscosity of the rubber solution, the rubber may be chlorinated by the addition of chlorine in amounts sufficient to secure reaction to produce a chlorinated rubber of the desired chlorine content, following the same procedures known to the art for the chlorination of the usual solutions of rubber. Alternately, the solution may be treated with hydrogen chloride in amount sufficient to produce a rubber hydrochloride of the desired chlorine content, which may, if desired, then be treated with chlorine to produce chlorinated rubber hydrochloride.

The process in accordance with my invention is further illustrated by the examples which follow:

*Example I*

Crepe rubber was dissolved in carbon tetrachloride to produce a solution having a concentration of 3½% by weight. To this solution was added 0.02% of its weight of dry chlorine gas. After the addition of the chlorine the solution was agitated continually and kept in the dark at room temperature, except during viscosity tests to determine the extent of the viscosity reduction. The viscosities of the solution, measured at intervals after the addition of chlorine, in comparison with the viscosities of a portion of the same solution to which no chlorine was added, as measured in Cochius seconds at 20° C. in a standard 7 mm. Cochius viscosity tube, are given in the following table:

| Time after addition of chlorine | Viscosity | |
| --- | --- | --- |
| | Control solution without chlorine | Solution with 0.02% chlorine |
| 0 minutes | Gel (above 60,000 sec.) | Gel (above 60,000 sec.) |
| 15 minutes | do | 11685 |
| 3.5 hours | do | 8733 |
| 16 hours | do | 4592 |
| 88 hours | do | 2173 |
| 160 hours | do | 574 |

After 160 hours the control solution and the chlorine treated solution were subjected to the usual chlorination process for producing chlorinated rubber by treatment with an excess chlorine at a temperature of 50° C. The solution which had been pretreated with chlorine, chlorinated without difficulty in approximately 8 hours to yield a satisfactory product containing approximately 66% chlorine. The gel-like control solution chlorinated with great difficulty under similar conditions. In spite of attempts made to stir the solution the chlorine gas channeled through the mass and the product obtained was non-homogeneous and unstable with an average chlorine content of approximately 43%.

*Example II*

To a 2% crepe rubber solution in carbon tetrachloride was added 0.001% chlorine gas (based on solution weight). The sample was held at 60° C. and exposed to diffused light. An aliquot of the original rubber solution taken before the addition of chlorine gas was held under similar conditions as a control. Relative viscosity determinations gave the following values.

| Time after addition of chlorine | Relative viscosity | |
| --- | --- | --- |
| | Control solution without chlorine | Solution with 0.001% chlorine |
| 0 hours | 1.00 | 1.00 |
| 1 hour | .97 | .55 |
| 2 hours | .94 | .42 |
| 3 hours | .91 | .40 |

The solution which had received the chlorine treatment for viscosity reduction could be chlorinated subsequently in the usual manner much more readily than the viscous control solution.

*Example III*

A 4% milled rubber solution in carbon tetrachloride with a viscosity of 560 cps. was treated with 0.02% chlorine to further reduce its viscosity. The following relative viscosities were obtained upon storage in the dark at 30° C.

| Time after addition of chlorine | Relative viscosity | |
| --- | --- | --- |
| | Control solution without chlorine | Solution with 0.02% chlorine |
| 0 hours | 1.00 | 1.00 |
| 7 hours | .98 | .87 |
| 55 hours | .95 | .38 |
| 79 hours | .92 | .21 |
| 103 hours | .90 | .15 |

The chlorine treated rubber solution with low viscosity chlorinated with greater ease than did the control sample.

*Example IV*

To 300 g. of a 5% crepe rubber solution in ethylene dichloride was added 200 g. of ethylene dichloride containing 1.0 g. dissolved chlorine. The sample was placed on the shaker and allowed to agitate for 1 hour. At the end of this period its viscosity was 2 seconds as measured by the falling ball viscosity method using a $\tfrac{5}{16}''$ steel ball and a 10-inch drop in a standard Wassig tube. A control sample treated in a similar manner with the exception that no chlorine was added to the diluting solvent showed a viscosity of 80 seconds on the same scale. Subsequent chlorination of the chlorine treated solution with low viscosity in the usual manner was more rapid and required less chlorine and power for agitation than did the chlorination of the untreated solution with high viscosity.

It will be understood that the details and examples hereinbefore set forth are illustrative only, and that the invention as herein broadly described and claimed is in no way limited thereby.

What I claim and desire to protect by Letters Patent is:

1. A process for the production of chlorinated rubber which comprises pretreating a solution of rubber in a volatile solvent therefor with chlorine in amount within the range of about 0.001% to about 1.0% by weight of the rubber solution and after the viscosity of the solution has been substantially reduced chlorinating the rubber.

2. A process for the production of chlorinated rubber which comprises pretreating a solution of rubber in a volatile solvent therefor with chlorine in amount within the range of about 0.02% to about 0.5% by weight of the rubber solution and after the viscosity of the solution has been substantially reduced chlorinating the rubber.

3. A process for the production of chlorinated rubber which comprises pretreating a solution of rubber in a volatile solvent therefor with chlorine in amount within the range of about 0.001% to about 1.0% by weight of the rubber solution at a temperature near the boiling point of the said solvent and after the viscosity of the solution has been substantially reduced, chlorinating the rubber.

4. A process for the production of chlorinated rubber which comprises pretreating a solution of rubber in a volatile solvent therefor with chlorine in amount within the range of about 0.02% to about 0.5% by weight of the rubber solution at a temperature near the boiling point of the said solvent and after the viscosity of the solution has been substantially reduced, chlorinating the rubber.

5. A process for the production of chlorinated rubber which comprises pretreating a solution of rubber in carbon tetrachloride with the chlorine in amount within the range of about 0.001% to about 1.0% by weight of the rubber solution and after the viscosity of the solution has been substantially reduced, chlorinating the rubber.

6. A process for the production of chlorinated rubber which comprises pretreating a solution of rubber in carbon tetrachloride with chlorine in amount within the range of about 0.02% to about 0.5% by weight of the rubber solution and after the viscosity of the solution has been substantially reduced, chlorinating the rubber.

JOHN M. PETERSON.